US011405645B2

(12) United States Patent
Han et al.

(10) Patent No.: US 11,405,645 B2
(45) Date of Patent: Aug. 2, 2022

(54) TRANSFORM KERNEL SELECTION AND ENTROPY CODING

(71) Applicant: GOOGLE LLC, Mountain View, CA (US)

(72) Inventors: Jingning Han, Santa Clara, CA (US); Yaowu Xu, Saratoga, CA (US); Ching-Han Chiang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 908 days.

(21) Appl. No.: 15/630,071

(22) Filed: Jun. 22, 2017

(65) Prior Publication Data

US 2018/0249179 A1 Aug. 30, 2018

Related U.S. Application Data

(60) Provisional application No. 62/464,615, filed on Feb. 28, 2017.

(51) Int. Cl.
*H04N 11/02* (2006.01)
*H04N 19/60* (2014.01)
(Continued)

(52) U.S. Cl.
CPC .............. *H04N 19/60* (2014.11); *G06N 7/005* (2013.01); *G06N 20/10* (2019.01); *H04N 19/12* (2014.11);
(Continued)

(58) Field of Classification Search
CPC ...... H04N 19/60; H04N 19/12; H04N 19/137; H04N 19/176; H04N 19/463;
(Continued)

(56) References Cited

U.S. PATENT DOCUMENTS 8,564,641 B1\* 10/2013 Levin ................... H04N 13/246
348/42
9,142,024 B2\* 9/2015 Sullivan ............... G06K 9/3216
(Continued)

FOREIGN PATENT DOCUMENTS

CN   103329523 A   9/2013
EP   1370087 A1   12/2003
(Continued)

OTHER PUBLICATIONS

Bankoski, et al., "Technical Overview of VP8, An Open Source Video Codec for the Web", Jul. 11, 2011, 6 pp.
(Continued)

*Primary Examiner* — Jayanti K Patel
*Assistant Examiner* — Richard B Carter
(74) *Attorney, Agent, or Firm* — Young Basile Hanlon & MacFarlane, P.C.

(57) ABSTRACT

Transform kernel candidates including a vertical transform type associated with a vertical motion and a horizontal transform type associated with a horizontal motion can be encoded or decoded. During an encoding operation, a residual block of a current block is transformed according to a selected transform kernel candidate to produce a transform block. A probability model for encoding the selected transform kernel candidate is then identified based on neighbor transform blocks of the transform block. The selected transform kernel candidate is then encoded according to the probability model. During a decoding operation, the encoded transform kernel candidate is decoded using the probability model. The encoded transform block is then decoded by inverse transforming dequantized transform coefficients thereof according to the decoded transform kernel candidate.

26 Claims, 8 Drawing Sheets

(51) Int. Cl.
   *G06N 7/00* (2006.01)
   *G06N 20/10* (2019.01)
   *H04N 19/12* (2014.01)
   *H04N 19/176* (2014.01)
   *H04N 19/137* (2014.01)
   *H04N 19/463* (2014.01)
   *H04N 11/04* (2006.01)
   *H04N 19/127* (2014.01)
   *H04N 19/157* (2014.01)

(52) U.S. Cl.
   CPC ......... *H04N 19/137* (2014.11); *H04N 19/176* (2014.11); *H04N 19/463* (2014.11); *H04N 11/044* (2013.01); *H04N 19/127* (2014.11); *H04N 19/157* (2014.11)

(58) Field of Classification Search
   CPC .. H04N 19/127; H04N 19/157; H04N 11/044; G06N 20/10; G06N 7/005
   USPC ...................................................... 375/240.2
   See application file for complete search history.

(56) References Cited

U.S. PATENT DOCUMENTS

| | | | |
|---|---|---|---|
| 9,674,530 B1 | 6/2017 | Bultje et al. | |
| 2012/0170649 A1 | 7/2012 | Chen et al. | |
| 2014/0247866 A1* | 9/2014 | Lee .................. | H04N 19/44 |
| | | | 375/240.02 |
| 2018/0041776 A1* | 2/2018 | Kim .................. | H04N 19/176 |

FOREIGN PATENT DOCUMENTS

| | | | |
|---|---|---|---|
| WO | 2011099789 A2 | 8/2011 | |
| WO | WO-2011099789 A2 * | 8/2011 | ........... H04N 19/176 |
| WO | 2016143991 A1 | 9/2016 | |

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Lazar Bivolarskichimail et al.; "VPS Encoder Technical Overview"; MPEG Meeting; Apr. 2013; Motion Picture Expert Group; 104 Pages.
International Search Report and Written Opinion for Internationap Application No. PCT/US2017/059272, dated Jan. 11, 2018.

* cited by examiner

TRANSFORM KERNEL SELECTION AND ENTROPY CODING

CROSS REFERENCE TO RELATED APPLICATION(S)

This disclosure claims the benefit of U.S. Provisional Application No. 62/464,615, filed Feb. 28, 2017, the disclosure of which is hereby incorporated by reference in its entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

A method for encoding transform kernel candidates selected for blocks of a video frame according to one implementation of the disclosure comprises selecting one of a plurality of transform kernel candidates for transforming a residual block of a current block of the video frame. The selected transform kernel candidate includes a vertical transform type associated with a vertical motion of the residual block and a horizontal transform type associated with a horizontal motion of the residual block. The method further comprises transforming the residual block according to the selected transform kernel candidate to produce a transform block including transform coefficients. The method further comprises quantizing the transform coefficients. The method further comprises, responsive to determining that at least one of the quantized transform coefficients is a non-zero coefficient, identifying a probability model for encoding the selected transform kernel candidate, the probability model identified based on a first transform kernel candidate selected for an above neighbor transform block of the transform block and a second transform kernel candidate selected for a left neighbor transform block of the transform block. The method further comprises encoding the selected transform kernel candidate according to the probability model.

An apparatus for encoding transform kernel candidates selected for blocks of a video frame according to another aspect of the disclosure comprises a processor configured to execute instructions stored in a non-transitory storage medium. The instructions include instructions to select one of a plurality of transform kernel candidates for transforming a residual block of a current block of the video frame. The selected transform kernel candidate includes a vertical transform type associated with a vertical motion of the residual block and a horizontal transform type associated with a horizontal motion of the residual block. The instructions further include instructions to transform the residual block according to the selected transform kernel candidate to produce a transform block including transform coefficients. The instructions further include instructions to quantize the transform coefficients. The instructions further include instructions to, responsive to a determination that at least one of the quantized transform coefficients is a non-zero coefficient, identify a probability model for encoding the selected transform kernel candidate, the probability model identified based on a first transform kernel candidate selected for an above neighbor transform block of the transform block and a second transform kernel candidate selected for a left neighbor transform block of the transform block. The instructions further include instructions to encode the selected transform kernel candidate according to the probability model.

A method for decoding an encoded transform block of a current block of an encoded video frame according to one implementation of the disclosure comprises identifying a probability model used to encode a transform kernel candidate selected for producing the encoded transform block, the probability model identified based on a first transform kernel candidate associated with an above neighbor transform block of the encoded transform block and a second transform kernel candidate associated with a left neighbor transform block of the encoded transform block. The method further comprises decoding the encoded transform kernel candidate using the probability model. The encoded transform kernel candidate includes a vertical transform type associated with a vertical motion of the current block and a horizontal transform type associated with a horizontal motion of the current block. The method further comprises decoding the encoded transform block by inverse transforming dequantized transform coefficients of the encoded transform block according to the decoded transform kernel candidate.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
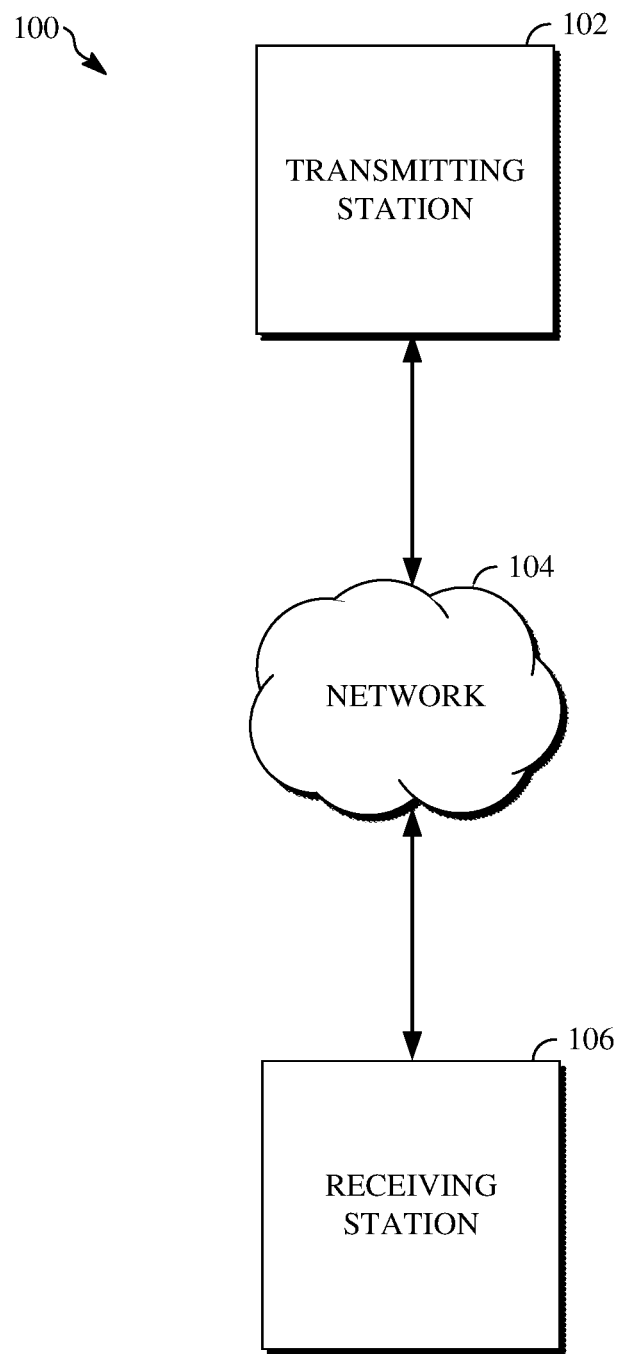
FIG. 1 is a schematic of a video encoding and decoding system.

Video compression schemes may include breaking respective images, or frames, into smaller portions, such as blocks, and generating an encoded bitstream using techniques to limit the information included for respective blocks thereof. The encoded bitstream can be decoded to re-create the source images from the limited information. For example, a video compression scheme can include transforming the prediction residual of a current block of a video stream into transform coefficients of transform blocks. The transform coefficients are quantized and entropy coded into an encoded bitstream. A decoder uses the encoded transform coefficients to decode or decompress the encoded bitstream to prepare the video stream for viewing or further processing.

The prediction residual of a current block is transformed using a transform type, for example, one of a discrete cosine transform (DCT) or an asymmetric discrete sine transform (ADST). The particular transform type used may be selected based on a direction of motion indicated in the prediction residual. For example, where the motion is symmetric about an origin within the current block, a DCT transform type may be selected. In another example, where the motion is not symmetric, but instead is noticeably greater in one area of the current block than in another, an ADST transform type may be selected. Nevertheless, the motion within a video stream is often complex. For example, a frame can include motion in a number of directions and at a number of positions therein. As such, it may not be possible to effectively transform a prediction residual using one transform type. However, selecting multiple transform types can result in additional cost to the bitstream, such as by increasing the amount of data that is communicated between an encoder and decoder.

Implementations of this disclosure include encoding or decoding transform kernel candidates selected or otherwise identified from a plurality of transform kernel candidates according to probability models. Each of the transform kernel candidates includes a vertical transform type and a horizontal transform type. A transform kernel candidate is selected or otherwise identified based on a vertical motion and a horizontal motion of a residual block that includes a prediction residual of a current block. During an encoding operation, the residual block is transformed according to the transform kernel candidate to produce a transform block. Transform coefficients of the transform block are quantized. Responsive to determining that at least one of the quantized transform coefficients is a non-zero coefficient, a probability model for encoding the selected transform kernel candidate is identified based on neighbor transform blocks of the transform block. The transform kernel candidate is then encoded according to the probability model. During a decoding operation, the transform kernel candidate selected for the transform block is decoded based on the probability model. The transform block is then dequantized and inverse transforming the dequantized transformed according to the transform kernel candidate to produce a reconstructed residual block.

Further details of techniques for encoding or decoding transform kernel candidates are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
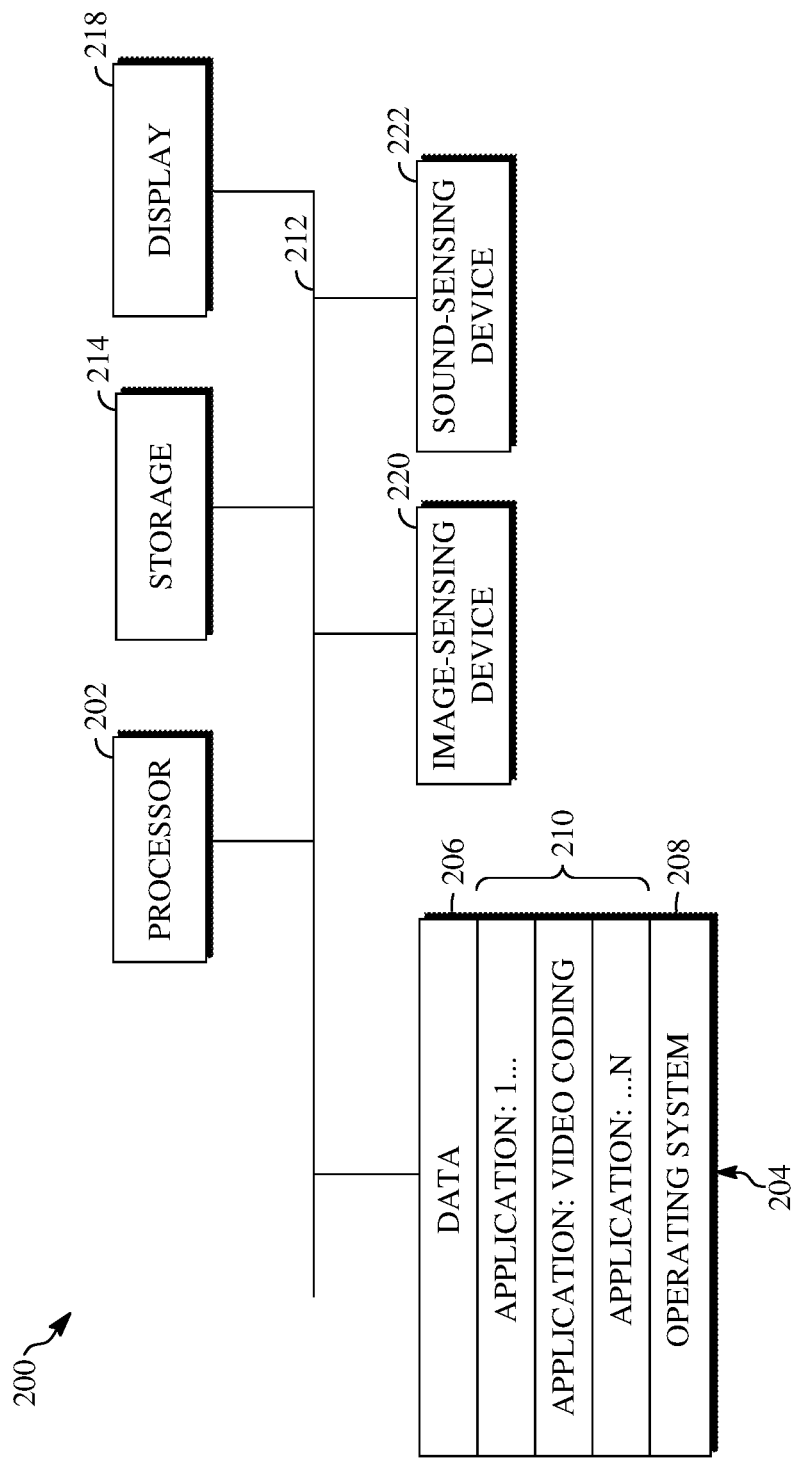
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be any other type of device, or multiple devices, capable of manipulating or processing information now existing or hereafter developed. Although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. Any other suitable type of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the methods described herein. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
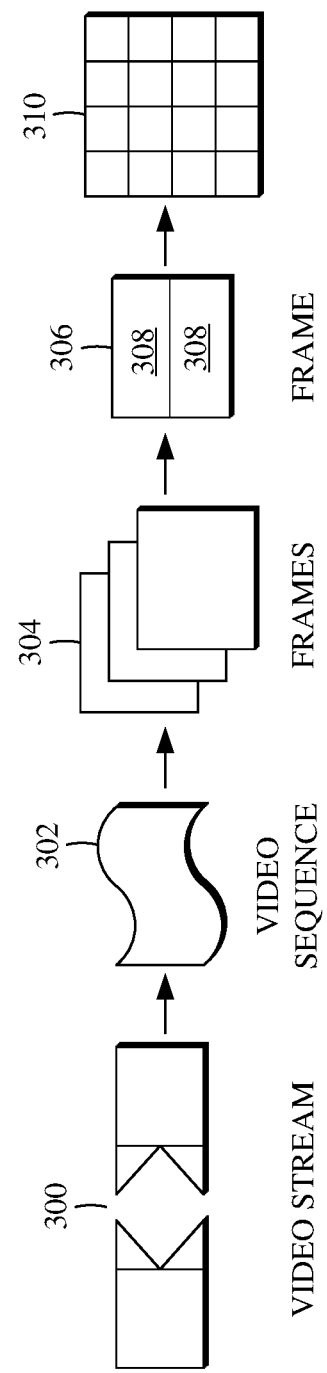
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
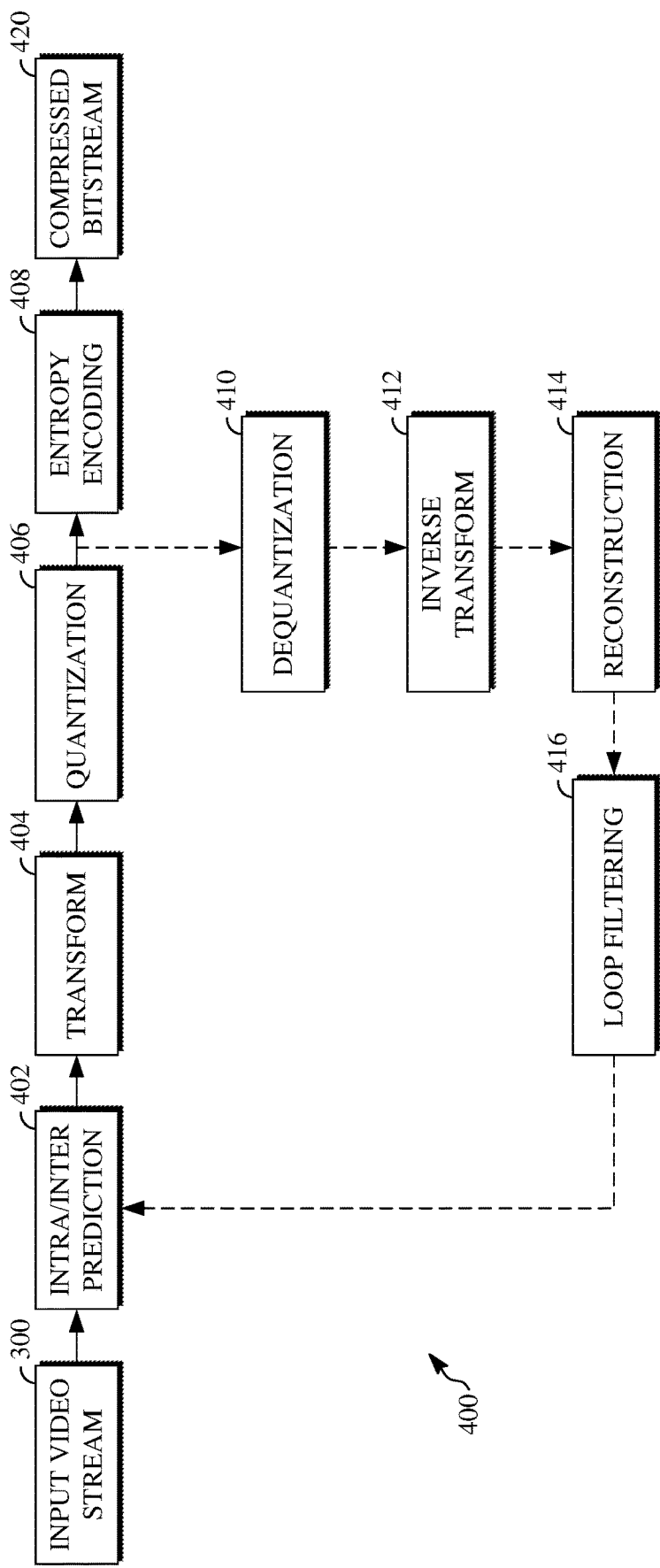
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. For example, the transform stage 404 can include selecting a transform kernel candidate for transforming the residual into transform coefficients. Implementations for selecting a transform kernel candidate are discussed below with respect to FIGS. 6 and 7, for example, based on a vertical motion and a horizontal motion of a residual block produced by the intra/inter prediction stage 402. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block (which may include, for example, the type of prediction used, transform type, motion vectors and quantizer value), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process (described below), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
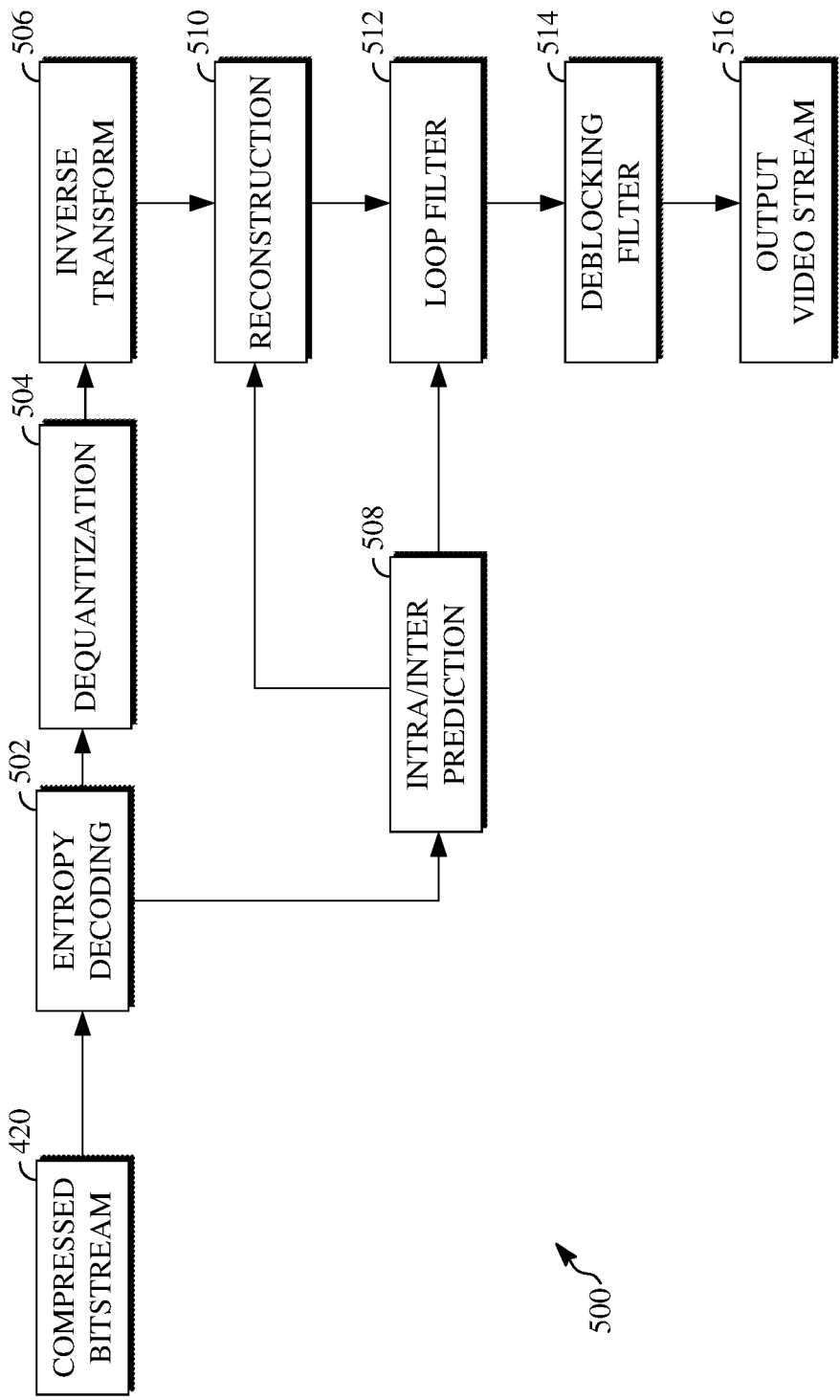
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Implementations for decoding a transform block using an encoded transform kernel candidate are discussed below with respect to FIGS. 6 and 8, for example, by decoding the encoded transform kernel candidate using a probability model identified based on a vertical motion and a horizontal motion of a current block associated with the transform block. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
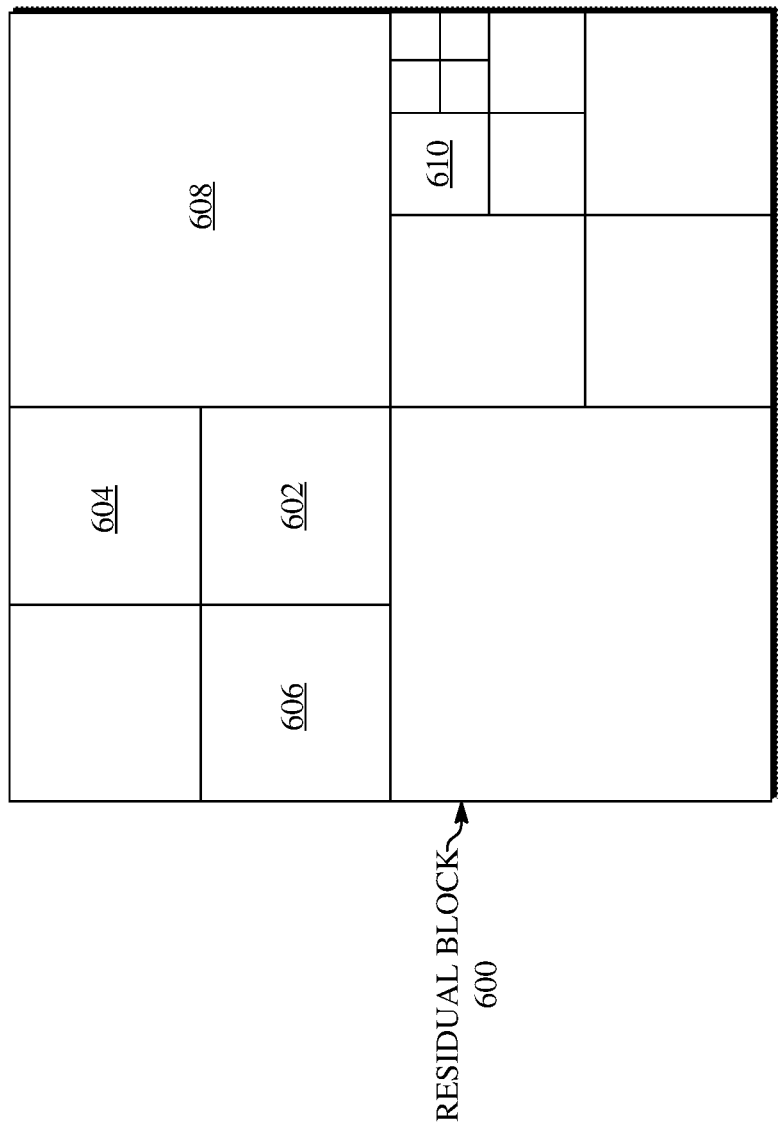
FIG. 6 is a diagram of a residual block partitioned into transform blocks.

FIG. 6 is a diagram of a residual block 600 partitioned into transform blocks 602, 604, 606, 608, and 610. The residual block 600 includes a prediction residual resulting from an inter- or intra-prediction operation. For example, the prediction residual can be generated, calculated, or otherwise identified using one or more motion vectors at the intra/inter prediction stage 402 shown in FIG. 4. Coefficients of the prediction residual can represent a difference between a current block being encoded and a prediction generated by the inter- or intra-prediction operation. The residual block 600 can be partitioned into one or more transform blocks (e.g., the transform blocks 602, 604, 606, 608, and 610) responsive to generating, calculating, or otherwise identifying the prediction residual.

Although the transform blocks 602, 604, 606, 608, and 610 are referred to as transform blocks, they are sub-blocks of the residual block 600 and therefore include portions of the residual block 600 until such a time as those coefficients are transformed. As such, the transform blocks 602, 604, 606, 608, and 610 may also or instead be referred to as residual blocks, residual sub-blocks, or the like. The transform blocks 602, 604, 606, 608, and 610 are thus referred to as transform blocks before and after a transformation operation is performed against the coefficients thereof (e.g., at the transform stage 404 shown in FIG. 4).

The coefficients of a transform block 602, 604, 606, 608, 610 are transformed according to a transform kernel candidate selected from a plurality of transform kernel candidates. Each candidate of the plurality includes a vertical transform type and a horizontal transform type. The vertical transform type is a transform type associated with a vertical motion direction. The horizontal transform type is a transform type associated with a horizontal motion direction. The vertical transform type and the horizontal transform type are each one of a DCT, an ADST, a flipped ADST, or an identify transform. As such, the plurality of transform kernel candidates can include sixteen transform kernel candidates representing the available combinations of vertical and horizontal transform types.

One transform kernel candidate can be selected from the plurality for transforming the coefficients of each transform block 602, 604, 606, 608, 610 of the residual block 600. For example, the transform kernel candidate DCT_flipped ADST (e.g., indicating DCT as the vertical transform type and flipped ADST as the horizontal transform type) can be selected for transforming the coefficients in each of the transform blocks 602, 604, 606, 608, and 610. Alternatively, a transform kernel candidate can be selected from the plurality for each transform block of the residual block 600. For example, the transform kernel candidate DCT_flipped ADST can be selected for transforming the coefficients of the transform block 602, the transform kernel candidate ADST_IDX can be selected for transforming the coefficients of the transform block 604, and so on. However, the same transform kernel candidate may still be selected for multiple transform blocks.

The transform blocks of the residual block 600 can be partitioned into different sizes. For example, the residual block 600 can be a 64×64 block. The transform blocks 602, 604, and 606 would each be 16×16 blocks. However, some transform blocks may be larger or smaller. For example, the transform block 608 would be a 32×32 block, whereas the transform block 610 would be an 8×8 block. The sizes of the transform blocks partitioned from the residual block 600 may be dependent upon the motion indicated within the prediction residual of the residual block 600.

As will be discussed below with respect to FIGS. 7 and 8, the transform kernel candidate selected for transforming all or a portion of the residual block 600 (e.g., one or more of the transform blocks 602, 604, 606, 608, or 610) can be encoded or decoded using a probability model. The probability model can be identified with reference transform kernel candidates selected for one or more neighbor transform blocks, such as one or both of an above neighbor transform block or a left neighbor transform block. For example, the transform block 602 can be a current transform block to be encoded. The transform block 604 is an above neighbor transform block of the transform block 602. The transform block 606 is a left neighbor transform block of the transform block 602. As such, a probability model for encoding a transform kernel candidate associated with the transform block 602 can be identified based on information associated with one or both of the transform block 604 or the transform block 606.

Implementations of the residual block 600 and the transform blocks 602, 604, 606, 608, and 610 depicted in FIG. 6 can include additional, less, or combined functionality as compared to that described above, or functionality other than that described above, or combinations thereof. In some implementations, the plurality of transform kernel candidates can be limited to a subset of the available combinations of DCT, ADST, flipped ADST, or identity transforms. For example, the one or more motion vectors used to generate the prediction residual of the residual block 600 may indicate that the residual block 600 does not include motion having magnitudes that are symmetrical about an origin pixel position. In such a case, the plurality of transform kernel candidates may include nine candidates, for example, where each vertical transform type and horizontal transform type is one of an ADST, flipped ADST, or identity transform.

Figure 7:
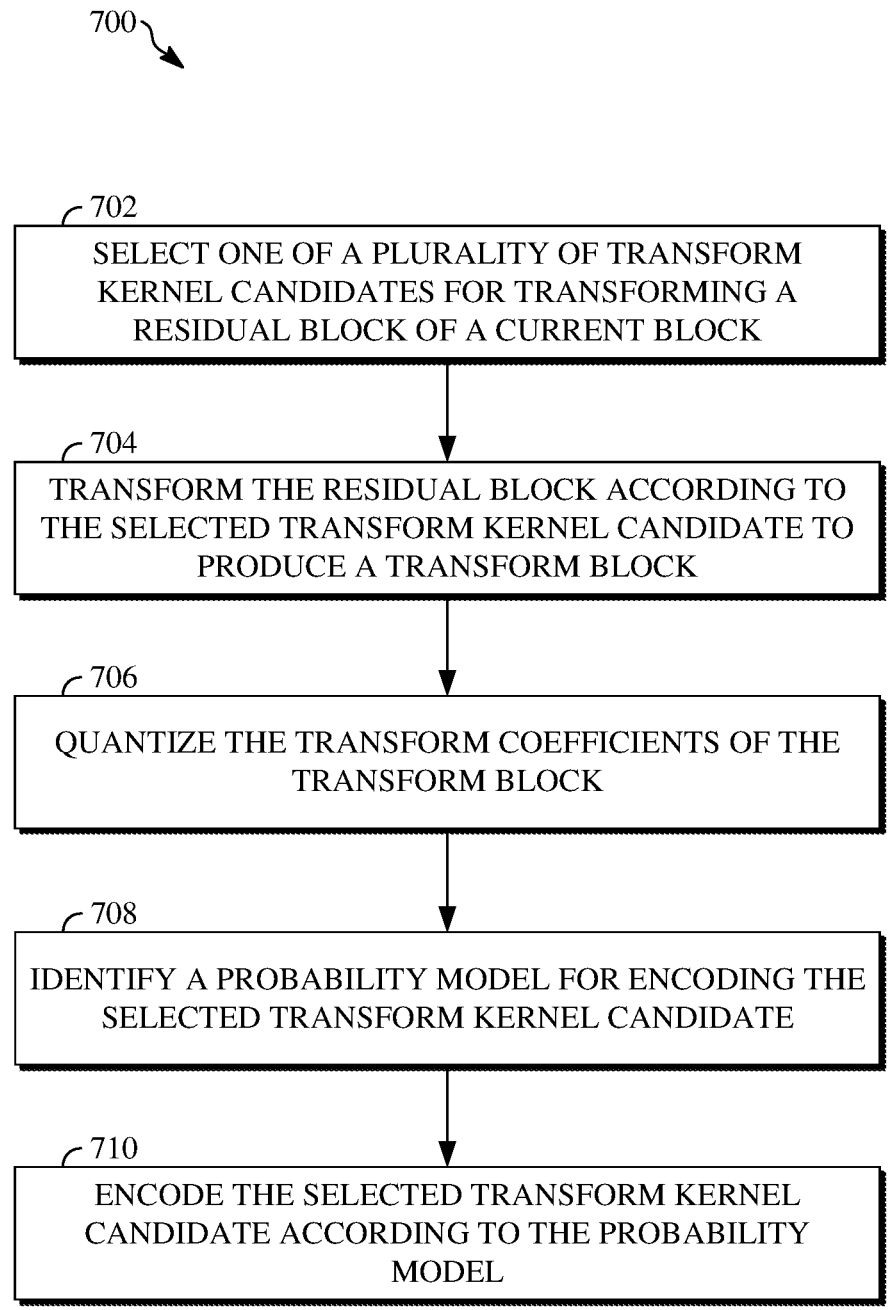
FIG. 7 is a flowchart diagram of a technique for encoding a transform kernel candidate selected for a current block of a video frame.

FIG. 7 is a flowchart diagram of a technique 700 for encoding a transform kernel candidate selected for a current block of a video frame. FIG. 8 is a flowchart diagram of a technique 800 for decoding a transform block of a current block of an encoded video frame. One or both of the technique 700 or the technique 800 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform one or both of the technique 700 or the technique 800. One or both of the technique 700 or the technique 800 can be implemented using specialized hardware or firmware. As explained above, some computing devices may have multiple memories or processors, and the operations described in one or both of the technique 700 or the technique 800 can be distributed using multiple processors, memories, or both.

For simplicity of explanation, the technique 700 and the technique 800 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

Referring first to FIG. 7, the technique 700 includes selecting one of a plurality of transform kernel candidates via 702, transforming a residual block via 704, quantizing transform coefficients of the transform block via 706, identifying a probability model for encoding the selected transform kernel candidate via 708, and encoding the selected transform kernel candidate according to the probability model via 710. All or a portion of the technique 700 can be performed using an encoder, such as the encoder 400 shown in FIG. 4.

At 702, one of a plurality of transform kernel candidates is selected for transforming a residual block of a current block. The residual block can be generated responsive to a prediction operation performed against the current block (e.g., at the intra/inter prediction stage 402 shown in FIG. 4). The transform kernel candidates of the plurality include a vertical transform type and a horizontal transform type. The vertical transform type indicates a transform type to use for a vertical motion, such as of the residual block. The horizontal transform type indicates a transform type to use for a horizontal motion, such as of the residual block. Each of the vertical transform type and the horizontal transform type is one of a DCT, ADST, flipped ADST, or identify transform. As such, there may be as many as sixteen transform kernel candidates in the plurality.

One of the transform kernel candidates of the plurality is selected based on vertical and horizontal motion of the residual block (e.g., indicated in the residual block). For example, selecting the transform kernel candidate to use can include identifying a shape of a vertical motion of the residual block and a shape of a horizontal motion of the residual block. The shape of the vertical motion can be identified by predicting a vertical motion of a portion of the current block using a motion vector. The shape of the horizontal motion can be identified by predicting a horizontal motion of the same portion of the current block using a motion vector. The motion vectors used to predict the vertical and horizontal motions can be the same motion vector or different motion vectors.

The portion of the current block within which the vertical and horizontal motions are predicted can refer to a residual block (e.g., the residual block 600 shown in FIG. 6) or a transform block (e.g., one of the transform blocks 602, 604, 606, 608, or 610 shown in FIG. 6), which can be a sub-block partitioned from a residual block. For example, prior to 702, the technique 700 can include partitioning the residual block into a plurality of sub-blocks. The plurality of sub-blocks can, for example, be the transform blocks 602, 604, 606, 608, and 610 shown in FIG. 6. As such, the vertical motion and horizontal motion used to select one of the transform kernel candidates at 702 can be a vertical motion and horizontal motion of one of those transform blocks 602, 604, 606, 608, or 610. As stated above with respect to FIG. 6, a block of the plurality of blocks partitioned from a residual block can be referred to as a residual block, a residual sub-block, a transform block, or the like.

The shape of the vertical and horizontal motions is used to identify the vertical and horizontal transform types for selecting one of the transform kernel candidates because each of the transform types corresponds to a different shape of motion. For example, with DCT, the magnitudes of the residual block symmetrically increase or decrease around an origin pixel position. With ADST, the magnitudes of the residual block are smaller (e.g., scaled to 0) at a first end of the motion and larger (e.g., scaled to 1) at a second end of the motion. With flipped ADST, the magnitudes of the residual block are larger at a first end of the motion and smaller at a second end of the motion. Separately, an identity transform is used when there is no motion in a vertical or horizontal direction.

At 704, the residual block is transformed according to the transform kernel candidate selected at 702. Transforming the residual block includes producing a transform block including transform coefficients. The transformation applied to the residual block is based on the vertical and horizontal transform types of the selected transform kernel candidate. For example, where the selected transform kernel candidate has an index of DCT_ADST, referring respectively to the vertical and horizontal transform types thereof, the transform applied to the residual block is a combination of DCT and ADST. In another example, where the selected transform kernel candidate has an index of IDX_DCT, only a DCT transform is applied. This is because identity transforms do not include transforming coefficients to a spatial domain. At 706, the transform coefficients of the transform block produced at 704 are quantized. For example, the transform coefficients can be quantized using operations performed at the quantization stage 406 shown in FIG. 4 to produce quantized transform coefficients.

At 708, a probability model for encoding the transform kernel candidate selected at 702 is identified. The identified probability model is used to determine a probability that a sufficient transform kernel candidate was used to transform the transform coefficients at 704. A probability model as may be identified at 708 can include an integer value that, when divided by a maximum value, indicates the probability of the selected transform kernel candidate being sufficient (e.g., represented as a percentage or like value). The maximum value can be a global maximum value shared by all or a portion of the probability models usable by the techniques of this disclosure.

For example, the maximum value can be in the scale of 256. A probability model having the probability model index 0 can include the integer value 119. That probability model indicates that there is a 119/256 probability that the selected transform kernel candidate is sufficient. That probability model further indicates that there is a (256−119)/256 probability that the selected transform kernel candidate is not sufficient. A selected transform kernel candidate may be considered sufficient if, for example, the vertical and horizontal transform types thereof correspond to the shapes of the motion of the residual block from which the transform block is produced.

The probability model can be identified based on a transform kernel candidate selected for transforming the transform coefficients of an above neighbor transform block of the transform block. The probability model can be also or instead identified based on a transform kernel candidate selected for transforming the transform coefficients of a left neighbor transform block of the transform block. Other information may additionally be used to identify the probability model. For example, the probability model may be identified based in part on a scan order of the transform block.

The use of information from one or both of an above neighbor transform block or a left neighbor transform block can be dependent upon the availability of such a neighbor transform block. For example, the transform block 606 shown in FIG. 6 has an above neighbor transform block (not numbered), but it does not have a left neighbor transform block. As such, the transform kernel candidate selected for the above neighbor block will be used to identify the probability model for the transform block 606.

A context value can be calculated based on the transform kernel candidate selected for the transform block at 702 and the transform kernel candidates selected for the above and left neighbor transform blocks, as applicable. For example, each of the transform kernel candidates of the plurality can be assigned an index value. A weighting function can be used to calculate the context value. For example, the index value assigned to the transform kernel candidate selected at 702 can be given a greater weight than the index values assigned to the transform kernel candidates used for the above and/or left neighbor transform blocks. If either or both of the above or left neighbor transform blocks are not available, index values therefor will not be used in the weighting function. The weighting function can take an average of the applicable index values to calculate the context value.

The context value may alternatively be calculated based on a vertical context and a horizontal context. For example, a vertical context can be determined based on a vertical transform type of the transform kernel candidate used by the above neighbor transform block and a vertical transform type of the transform kernel candidate used by the left neighbor transform block, as applicable. A horizontal context can be determined based on a horizontal transform type of the transform kernel candidate used by the above neighbor transform block and a horizontal transform type of the transform kernel candidate used by the left neighbor transform block, as applicable. The vertical transform type and horizontal transform type of the transform kernel candidate selected at 702 can also be used to determine the vertical context and horizontal context, respectively.

The probability model for encoding the selected transform kernel candidate can be identified based on the context value. For example, there may be a probability model associated with each possible value of the context value. In another example, one probability model may be associated with a range of possible values of the context value.

At 710, the selected transform kernel candidate is encoded according to the probability model identified at 706. The probabilities associated with the identified probability model are processed using entropy coding (e.g., at the entropy coding stage 408 shown in FIG. 4). For example, arithmetic coding can be used to determine the sufficiency of the selected transform kernel candidate using the probabilities associated with the identified probability model. Once the sufficiency of the selected transform kernel candidate is determined, for example, at the entropy coding stage 408 of the encoder 400, it can be compressed into an encoded bitstream.

The transform kernel candidate can be encoded as a combination index indicative of the vertical and horizontal transform types thereof. For example, a single index can be encoded to a bitstream to indicate both of the vertical and horizontal transform types of the selected transform kernel candidate. Alternatively, the vertical and horizontal transform types can be separately encoded to the bitstream. For example, a first index can be encoded to the bitstream to indicate the vertical transform type and a second index can be encoded to the bitstream to indicate the horizontal transform type.

In some implementations, the probability model identified at 708 can be updated, for example, responsive to encoding a final block of the video frame. Updating the probability model can include counting a number of times that the transform kernel candidate selected at 702 is selected for encoding blocks of the video frame. For example, that number can be updated responsive to each applicable block being encoded. The probability model can be updated based on the total number resulting after a final block of the video frame is encoded. For example, if the count is higher than a threshold, the probability model can be updated to reflect that the probability that the transform kernel candidate is sufficient is increased. If the count is lower than the threshold, the probability model can be updated to reflect that that probability is decreased. The threshold can be, for example, a total count of selections of that transform kernel candidate from a previous video frame.

Updates to the probability model can be independently made by each of an encoder and decoder. For example, the encoder (e.g., performing all or a portion of the technique 700) and the decoder (e.g., performing all or a portion of the technique 800 of FIG. 8) can separately store probability models usable for encoding and decoding transform blocks according to the techniques of this disclosure. As such, the probabilities associated with a probability model may be different at the encoder than at the decoder. Alternatively, updates to the probability model can be determined at the encoder and communicated to the decoder. For example, the encoder can update the probabilities associated with a probability model after a video frame is encoded so that those updated probabilities can be used to decode the encoded video frame.

In some implementations, the probability model may be identified at 708 responsive to determining that at least one of quantized transform coefficients of the transform block is a non-zero coefficient. For example, the quantization at 706 may result in all of the transform coefficients of the transform block being zero. The technique 700 may include not proceeding to 708 in such cases to reduce the additional rate cost for transmitting data between the encoder and decoder.

For example, a transform block skip flag can be used to identify transform blocks that are not to be entropy coded and transmitted within an encoded bitstream. If all of the quantized coefficients of the quantized transform block are zero, the transform block skip flag can have a value indicating to skip the encoding of that transform block. The technique 700 can then terminate with respect to that transform block and restart for a different transform block. However, if at least one of those quantized coefficients is a non-zero coefficient, the transform block skip flag can have a value indicating to encode that transform block, such as by proceeding to identify a probability model for the transform block.

In some implementations, the value of the transform block skip flag can be entropy coded. For example, a probability model for the transform block skip flag can be identified based on the value thereof as well as the value of that flag for one or both of an above neighbor transform block of the transform block or a left neighbor transform block of the transform block. In another example, other information, such as a size of the transform block or a size of the current block that includes the transform block and one or both of the above or left neighbor transform blocks, can be used to identify the probability model for the transform block skip flag. The value of that flag can then be entropy encoded according to its probability model.

Figure 8:
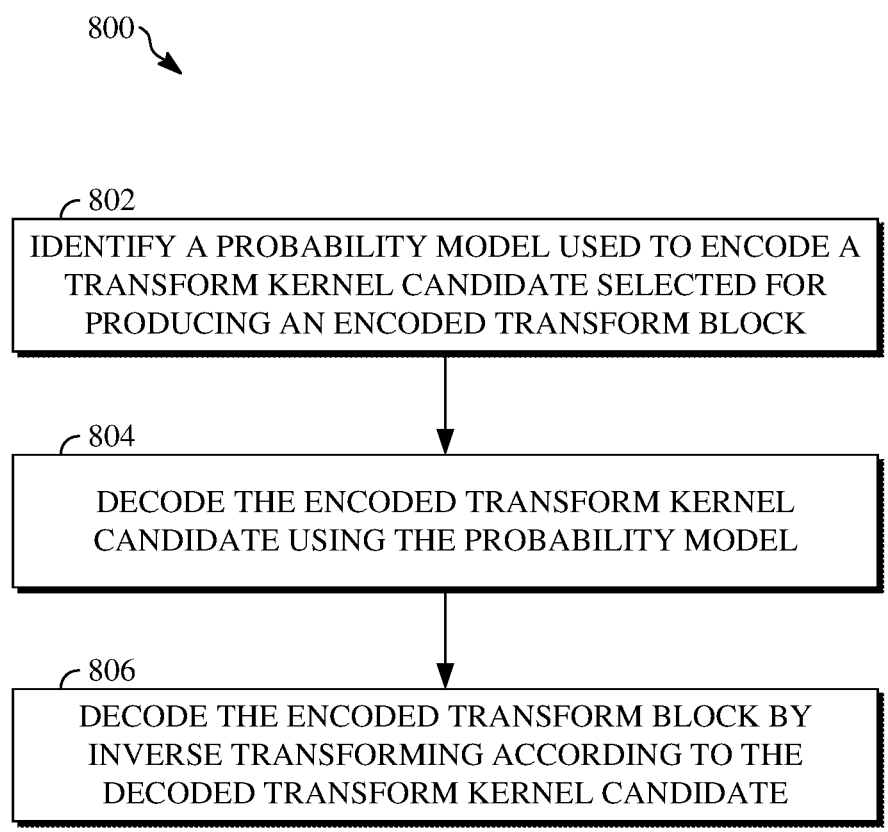
FIG. 8 is a flowchart diagram of a technique for decoding a transform block of a current block of an encoded video frame.

Referring next to FIG. 8, the technique 800 includes identifying a probability model used to encode a transform kernel candidate via 802, decoding the transform kernel candidate via 804, and decoding an encoded transform block by inverse transforming dequantized transform coefficients thereof via 806. All or a portion of the technique 800 can be performed using a decoder, such as the decoder 500 shown in FIG. 5.

At 802, a probability model used to encode the transform kernel candidate selected for producing an encoded transform block is identified. The technique for identifying the probability model at 802 can be the same as the technique for identifying the probability model at 708 of the technique 700 shown in FIG. 7. For example, the probability model can be identified at 802 based on information associated with one or both of an above neighbor transform block or a left neighbor transform block of the encoded transform block to be decoded.

At 804, the encoded transform kernel candidate is decoded using the probability model identified at 802. For example, the encoded transform kernel candidate can be encoded to the bitstream including the encoded transform block being decoded. Decoding the encoded transform kernel candidate using the probability model can include decoding a first index and a second index of the transform kernel candidate. The first index can correspond to a vertical transform type of the transform kernel candidate. The second index can correspond to a horizontal transform type of the transform kernel candidate. For example, the first index can be decoded using a vertical context of the probability model identified at 802 and the second index can be decoded using a horizontal context of the probability model.

At 806, the encoded transform block is decoded by inverse transforming dequantized transform coefficients thereof according to the transform kernel candidate decoded at 804. Decoding the transform block at 806 can include dequantizing the quantized transform coefficients of the encoded transform block, for example, using operations performed at the dequantization stage 504 shown in FIG. 5. The dequantized transform coefficients can then be inverse transformed according to the decoded transform kernel candidate.

In some implementations, decoding the encoded transform block at 806 can include entropy decoding the coefficients of the encoded transform block prior to dequantizing them. For example, the coefficients of the encoded transform block can be entropy decoded using operations performed at the entropy decoding stage 502 shown in FIG. 5. In some implementations, the coefficients of the encoded transform block can be entropy decoded before the transform kernel candidate is identified at 804.

In some implementations, the probability model may be identified at 802 responsive to determining that at least one of quantized transform coefficients of the encoded transform block is a non-zero coefficient. For example, a transform block skip flag (e.g., the transform block skip flag discussed above with respect to FIG. 7) can be transmitted within an encoded bitstream. If all of the quantized transform coefficients of the encoded transform block are zero, the transform block skip flag can have a value indicating to skip the decoding of that encoded transform block. The technique 800 can then terminate with respect to that encoded transform block and restart for a different encoded transform block. However, if at least one of those quantized transform coefficients is a non-zero coefficient, the transform block skip flag can have a value indicating to decode that encoded transform block, such as by proceeding to identify the probability model at 802.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding transform kernel candidates selected for blocks of a video frame, the method comprising:
  selecting one of a plurality of transform kernel candidates for transforming a residual block of a current block of the video frame, the selected transform kernel candidate including a vertical transform type associated with a vertical motion of the residual block and a horizontal transform type associated with a horizontal motion of the residual block;
  transforming the residual block according to the selected transform kernel candidate to produce a transform block including transform coefficients;
  quantizing the transform coefficients;
  responsive to determining that at least one of the quantized transform coefficients is a non-zero coefficient, identifying a probability model for encoding the selected transform kernel candidate, the probability model identified based on a first transform kernel candidate selected for an above neighbor transform block of the transform block and a second transform kernel candidate selected for a left neighbor transform block of the transform block; and
encoding the selected transform kernel candidate according to the probability model.

2. The method of claim 1, wherein selecting one of a plurality of transform kernel candidates for transforming a residual block of a current block of the video frame comprises:
identifying a shape of the vertical motion of the residual block by predicting a vertical motion of a portion of the current block using a first motion vector;
identifying a shape of the horizontal motion of the residual block by predicting a horizontal motion of the portion of the current block using a second motion vector; and
selecting the selected transform kernel candidate based on the shape of the vertical motion of the residual block and the shape of the horizontal motion of the residual block.

3. The method of claim 1, wherein identifying a probability model for encoding the selected transform kernel candidate comprises:
determining a vertical context based on a first vertical transform type of the first transform kernel candidate and a second vertical transform type of the second transform kernel candidate;
determining a horizontal context based on a first horizontal transform type of the first transform kernel candidate and a second horizontal transform type of the second transform kernel candidate; and
identifying the probability model using the vertical context and the horizontal context.

4. The method of claim 1, wherein the transform block is a first transform block, wherein the method further comprises:
generating the residual block using a motion vector, the residual block including a prediction residual for the current block; and
partitioning the residual block into a plurality of sub-blocks including a first residual sub-block and a second residual sub-block, wherein the first residual sub-block is transformed to produce the first transform block and the second residual sub-block is transformed to produce a second transform block.

5. The method of claim 4, wherein the selected transform kernel candidate is different from a transform kernel candidate selected for transforming the second residual sub-block.

6. The method of claim 4, wherein the selected transform kernel candidate is also selected for transforming the second residual sub-block.

7. The method of claim 1, wherein at least one of the vertical transform type or the horizontal transform type of the selected transform kernel candidate is one of a DCT, an ADST, a flipped ADST, or an identity transform.

8. An apparatus for encoding transform kernel candidates selected for blocks of a video frame, the apparatus comprising:
a processor configured to execute instructions stored in a non-transitory storage medium to:
select one of a plurality of transform kernel candidates for transforming a residual block of a current block of the video frame, the selected transform kernel candidate including a vertical transform type associated with a vertical motion of the residual block and a horizontal transform type associated with a horizontal motion of the residual block;
transform the residual block according to the selected transform kernel candidate to produce a transform block including transform coefficients;
quantize the transform coefficients;
responsive to a determination that at least one of the quantized transform coefficients is a non-zero coefficient, identify a probability model for encoding the selected transform kernel candidate, the probability model identified based on a first transform kernel candidate selected for an above neighbor transform block of the transform block and a second transform kernel candidate selected for a left neighbor transform block of the transform block; and
encode the selected transform kernel candidate according to the probability model.

9. The apparatus of claim 8, wherein the instructions to select one of a plurality of transform kernel candidates for transforming a residual block of a current block of the video frame include instructions to:
identify a shape of the vertical motion of the residual block by predicting a vertical motion of a portion of the current block using a first motion vector;
identify a shape of the horizontal motion of the residual block by predicting a horizontal motion of the portion of the current block using a second motion vector; and
select the selected transform kernel candidate based on the shape of the vertical motion of the residual block and the shape of the horizontal motion of the residual block.

10. The apparatus of claim 8, wherein the instructions to identify a probability model for encoding the selected transform kernel candidate include instructions to:
determine a vertical context based on a first vertical transform type of the first transform kernel candidate and a second vertical transform type of the second transform kernel candidate;
determine a horizontal context based on a first horizontal transform type of the first transform kernel candidate and a second horizontal transform type of the second transform kernel candidate; and
identify the probability model using the vertical context and the horizontal context.

11. The apparatus of claim 8, wherein the transform block is a first transform block, wherein the instructions include instructions to:
generate the residual block using a motion vector, the residual block including a prediction residual for the current block; and
partition the residual block into a plurality of sub-blocks including a first residual sub-block and a second residual sub-block, wherein the first residual sub-block is transformed to produce the first transform block and the second residual sub-block is transformed to produce a second transform block.

12. The apparatus of claim 11, wherein the selected transform kernel candidate is different from a transform kernel candidate selected for the second residual sub-block.

13. The apparatus of claim 11, wherein the selected transform kernel candidate is also selected for transforming the second residual sub-block.

14. The apparatus of claim 8, wherein at least one of the vertical transform type or the horizontal transform type of the selected transform kernel candidate is one of a DCT, an ADST, a flipped ADST, or an identity transform.

15. A method for decoding an encoded transform block of a current block of an encoded video frame, the method comprising:

identifying a probability model used to encode a transform kernel candidate selected for producing the encoded transform block, the probability model identified based on a first transform kernel candidate associated with an above neighbor transform block of the encoded transform block and a second transform kernel candidate associated with a left neighbor transform block of the encoded transform block;

decoding the encoded transform kernel candidate using the probability model, the encoded transform kernel candidate including a vertical transform type associated with a vertical motion of the current block and a horizontal transform type associated with a horizontal motion of the current block; and decoding the encoded transform block by inverse transforming dequantized transform coefficients of the encoded transform block according to the decoded transform kernel candidate.

16. The method of claim 15, wherein identifying a probability model used to encode a transform kernel candidate selected for producing the encoded transform block comprises:

determining a vertical context based on a first vertical transform type of the first transform kernel candidate and a second vertical transform type of the second transform kernel candidate;

determining a horizontal context based on a first horizontal transform type of the first transform kernel candidate and a second horizontal transform type of the second transform kernel candidate; and identifying the probability model using the vertical context and the horizontal context.

17. The method of claim 15, wherein decoding the encoded transform kernel candidate based on the probability model comprises:

decoding, based on the probability model, a first index corresponding to the vertical transform type of the encoded transform kernel candidate based and a second index corresponding to the horizontal transform type of the encoded transform kernel candidate.

18. The method of claim 15, wherein the encoded transform block is a first encoded transform block and the current block further includes a second encoded transform block, wherein the encoded transform kernel candidate is different from a transform kernel candidate selected for transforming coefficients of the second encoded transform block.

19. The method of claim 15, wherein the probability model is identified responsive to determining that at least one quantized transform coefficient of the encoded transform block is a non-zero coefficient.

20. The method of claim 15, wherein at least one of the vertical transform type or the horizontal transform type of the encoded transform kernel candidate is one of a DCT, an ADST, a flipped ADST, or an identity transform.

21. An encoder that performs operations for encoding transform kernel candidates selected for blocks of a video frame, the operations comprising:

selecting one of a plurality of transform kernel candidates for transforming a residual block of a current block of the video frame, the selected transform kernel candidate including a vertical transform type associated with a vertical motion of the residual block and a horizontal transform type associated with a horizontal motion of the residual block;

transforming the residual block according to the selected transform kernel candidate to produce a transform block including transform coefficients;

quantizing the transform coefficients;

responsive to determining that at least one of the quantized transform coefficients is a non-zero coefficient, identifying a probability model for encoding the selected transform kernel candidate, the probability model identified based on a first transform kernel candidate selected for an above neighbor transform block of the transform block and a second transform kernel candidate selected for a left neighbor transform block of the transform block; and encoding the selected transform kernel candidate according to the probability model.

22. The encoder of claim 21, wherein selecting one of a plurality of transform kernel candidates for transforming a residual block of a current block of the video frame comprises:

identifying a shape of the vertical motion of the residual block by predicting a vertical motion of a portion of the current block using a first motion vector;

identifying a shape of the horizontal motion of the residual block by predicting a horizontal motion of the portion of the current block using a second motion vector; and selecting the selected transform kernel candidate based on the shape of the vertical motion of the residual block and the shape of the horizontal motion of the residual block.

23. The encoder of claim 21, wherein identifying a probability model for encoding the selected transform kernel candidate comprises:

determining a vertical context based on a first vertical transform type of the first transform kernel candidate and a second vertical transform type of the second transform kernel candidate;

determining a horizontal context based on a first horizontal transform type of the first transform kernel candidate and a second horizontal transform type of the second transform kernel candidate; and identifying the probability model using the vertical context and the horizontal context.

24. The encoder of claim 21, wherein the transform block is a first transform block, wherein the operations further comprise:

generating the residual block using a motion vector, the residual block including a prediction residual for the current block; and partitioning the residual block into a plurality of sub-blocks including a first residual sub-block and a second residual sub-block, wherein the first residual sub-block is transformed to produce the first transform block and the second residual sub-block is transformed to produce a second transform block.

25. The encoder of claim 24, wherein the selected transform kernel candidate is different from a transform kernel candidate selected for transforming the second residual sub-block.

26. The encoder of claim 24, wherein the selected transform kernel candidate is also selected for transforming the second residual sub-block.

* * * * *